US011159676B1

(12) United States Patent
Ginter (10) Patent No.: US 11,159,676 B1
(45) Date of Patent: Oct. 26, 2021

(54) METHODS FOR EMERGENCY RESPONSE LOCATION (ERL) CORRECTION IN A VOICE OVER INTERNET PROTOCOL (VOIP) 911 SERVER AND RELATED SYSTEMS AND COMPUTER PROGRAM PRODUCTS

(71) Applicant: Bandwidth, Inc., Raleigh, NC (US)

(72) Inventor: Thomas Ginter, Allen, TX (US)

(73) Assignee: Bandwidth, Inc., Raleigh, NC (US)

( * ) Notice: Subject to any disclaimer, the term of this patent is extended or adjusted under 35 U.S.C. 154(b) by 0 days.

(21) Appl. No.: 17/329,598

(22) Filed: May 25, 2021

(51) Int. Cl.
  *H04M 3/42* (2006.01)
  *H04W 4/02* (2018.01)
  *H04W 4/50* (2018.01)
  *H04M 3/51* (2006.01)
  *H04M 7/00* (2006.01)

(52) U.S. Cl.
  CPC ..... *H04M 3/42357* (2013.01); *H04M 3/5116* (2013.01); *H04M 7/0075* (2013.01)

(58) Field of Classification Search
  None
  See application file for complete search history.

(56) References Cited

U.S. PATENT DOCUMENTS

| | | | | |
|---|---|---|---|---|
| 7,826,598 | B1* | 11/2010 | Prozeniuk | H04M 3/42348 379/45 |
| 9,642,167 | B1* | 5/2017 | Snyder | H04L 65/1059 |
| 2005/0007999 | A1* | 1/2005 | Becker | H04L 67/18 370/352 |
| 2005/0083911 | A1* | 4/2005 | Grabelsky | H04Q 3/0025 370/352 |
| 2006/0120517 | A1* | 6/2006 | Moon | H04W 76/50 379/45 |
| 2010/0248682 | A1* | 9/2010 | Prozeniuk | H04W 76/50 455/404.2 |
| 2015/0312738 | A1* | 10/2015 | Deich | H04M 3/42357 370/328 |
| 2015/0334545 | A1* | 11/2015 | Maier | H04M 1/72433 455/404.2 |
| 2016/0262126 | A1* | 9/2016 | Hillier | H04W 64/00 |
| 2020/0351623 | A1* | 11/2020 | Eisner | H04W 4/80 |
| 2021/0153001 | A1* | 5/2021 | Eisner | H04W 64/003 |

\* cited by examiner

*Primary Examiner* — Duc T Duong
(74) *Attorney, Agent, or Firm* — Stanek Lemon Crouse + Meeks; Gregory Stephens (57) ABSTRACT

Methods for ERL Correction are provided including receiving a VoIP emergency call from an emergency caller. The VoIP emergency call is identified by a unique ELIN. The ERL data associated with the unique ELIN is retrieved from a LIS using the unique ELIN. A notification is intercepted at the LIS. The notification contains both an original extension number or a DID number and the ERL data. The ERL data is matched using the ELIN to the ERL data to locate one of the original extension number and the DID number. A correct physical address is located using the original extension number or the DID number. Address data is corrected in the ERL to include the correct physical address of the emergency caller to provide a corrected ERL. The notification is reissued including the corrected ERL and the VoIP emergency call is routed to a PSAP with the corrected ERL.

24 Claims, 6 Drawing Sheets

METHODS FOR EMERGENCY RESPONSE LOCATION (ERL) CORRECTION IN A VOICE OVER INTERNET PROTOCOL (VOIP) 911 SERVER AND RELATED SYSTEMS AND COMPUTER PROGRAM PRODUCTS

FIELD

The present inventive concept generally relates to emergency calls and, more particularly, to enhanced emergency calling or "E911" for Voice over Internet Protocol (VoIP) Systems.

BACKGROUND

With the number of people working from home significantly increasing over the past year due, in part, to the COVID pandemic, pinpointing the correct location (physical address) of a 911 emergency caller has become more difficult. For example, the relocation of office equipment from the physical location of the business enterprise to a home office complicates providing the correct physical location of the 911 emergency caller to the 911 operator (public safety). In particular, a Voice over Internet Protocol (VoIP) call made from the relocated office equipment is presumed to be made from the physical location of the business enterprise, not the home of the worker/caller. Current functionality of VoIP 911 services may not be able to adequately accommodate for the relocation of office equipment to a worker's home office, thus, improved VoIP 911 services may be desired.

SUMMARY

Some embodiments of the present inventive concept provide methods for Emergency Response Location (ERL) Correction. The method includes receiving a Voice over Internet Protocol (VoIP) emergency call from an emergency caller. The VoIP emergency call is identified by a unique emergency location identification number (ELIN). The emergency response location (ERL) data associated with the unique ELIN for the received VoIP emergency call is retrieved from a location information server (LIS) using the unique ELIN to locate the ERL data. A notification is intercepted, at the LIS, from a multi-line telephone system (MLTS) at an enterprise associated with the ELIN. The notification contains both an original extension number associated with the emergency caller or a direct inward dialing (DID) number associated with the emergency caller and the ERL data. The ERL data retrieved is matched using the ELIN to the ERL data in the intercepted notification to locate one of the original extension number and the DID number in the LIS associated with the emergency caller. A correct physical address of the emergency caller stored in the LIS is located using the original extension number or the DID number to locate the correct physical address of the emergency call in the LIS. Address data is corrected in the ERL to include the correct physical address of the emergency caller to provide a corrected ERL. The notification is reissued including the corrected ERL to the enterprise. The VoIP emergency call is routed to a Public Safety Answering Point (PSAP) with the corrected ERL.

Related systems and computer program products are provided.

DETAILED DESCRIPTION OF EMBODIMENTS

The inventive concept now will be described more fully hereinafter with reference to the accompanying drawings, in which illustrative embodiments of the inventive concept are shown. This inventive concept may, however, be embodied in many different forms and should not be construed as limited to the embodiments set forth herein; rather, these embodiments are provided so that this disclosure will be thorough and complete, and will fully convey the scope of the inventive concept to those skilled in the art. Like numbers refer to like elements throughout. As used herein, the term "and/or" includes any and all combinations of one or more of the associated listed items. Similarly, as used herein, the word "or" is intended to cover inclusive and exclusive OR conditions. In other words. A or B or C includes any or all of the following alternative combinations as appropriate for a particular usage: A alone; B alone; C alone; A and B only; A and C only; B and C only; and A and B and C.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Reference will now be made in detail in various and alternative example embodiments and to the accompanying figures. Each example embodiment is provided by way of explanation, and not as a limitation. It will be apparent to those skilled in the art that modifications and variations can be made without departing from the scope or spirit of the disclosure and claims. For instance, features illustrated or described as part of one embodiment may be used in connection with another embodiment to yield a still further embodiment. Thus, it is intended that the present disclosure includes modifications and variations that come within the scope of the appended claims and their equivalents.

As discussed above, relocation of office equipment from the physical location of the business enterprise to a home office of a worker complicates providing a correct physical location of the emergency caller to public safety operators. Accordingly, some embodiments of the present inventive concept provide for correct physical location (address) information to be provided to public safety personnel for a remote worker making a 911 emergency call on a legacy Multi-Line Telephone System (MLTS) system. In some embodiments, the location information is unknown to the legacy MLTS and, therefore, embodiments of the present inventive concept locate the correct information and provide that correct information to the public safety personnel as will be discussed further herein.

As used herein, "MLTS" refers to MLTS as defined by the Federal Communication Commission (FCC) and is inclusive of terms such as Private Branch Exchange (PBX), enterprise communication system (ECS) enterprise phone system, office phone system, soft-PBX or similar terminology without departing from the scope of the present inventive concept. Thus, throughout the specification, when MLTS is referred to, one or more of these items may be included. Furthermore, some embodiments of the present inventive concept relate to all MLTSs and/or cloud-based MLTSs making use of the VoIP 911 calling services. Some brands of such MLTSs include, but are not limited to, Asterisk; Avaya; Broadworks; Cisco Call Manager; FreePBX; FreeSwitch; GENBAND; MetaSwitch; Mitel; NetSapiens; ShorTel; 3CX and the like.

Enhanced emergency calling, or "E911", services currently exist and are in use. E911 for Voice over IP (VoIP) is based on the North American Emergency Number Association standard "NENA 008-001." This specification is titled "NENA Interim VOIP Architecture for Enhanced 9-1-1 Service (i2)." It was first released in 2005 and updated and republished in 2010. Services for VoIP 911 that are based on this standard are commonly referred to as "i2 services" or "VoIP Position Center (VPC) services". These names are all essentially synonymous with "VoIP 911," which will be used throughout the current specification and will be considered as inclusive of all the aforementioned citations.

Providers of VoIP 911 services must comply with all 911 regulations. Two significant 911 regulations are Section 506 of Ray Baum's Act and Kari's Law. Ray Baum's Act states that when a 911 call is placed, the call must include a "dispatchable location," A dispatchable location refers to the street address and city associated with the 911 emergency caller along with further defining factors, such as building, floor or room number etc. In other words, Ray Baum's Act requires that the 911 operator be given enough information to find the location of the emergency call. Kari's Law requires direct 911 dialing and notification capabilities in the MLTS, which are typically found in enterprises such as office buildings, campuses, hotels and the like. More specifically, Kari's Law stipulates that a notification (Kari's Law Notification) must be provided to persons at an enterprise, for example, at the front desk, security desk etc., when a 911 call is made from the building using the building's MLTS and that the location of the 911 emergency caller be correctly disclosed to the persons at the enterprise.

Figure 1:
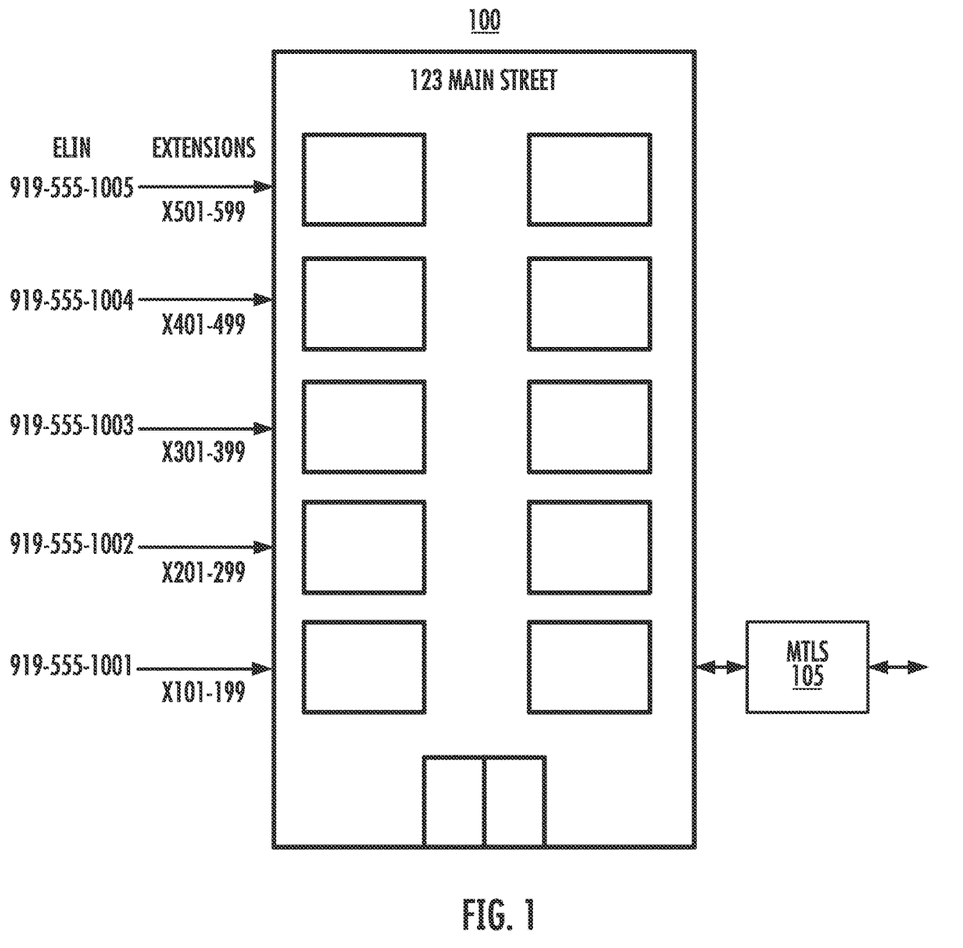
FIG. 1 is a basic block diagram of a multistory building having a multi-line telephone system (MLTS) in accordance with some embodiments of the present inventive concept.

FIG. 1 is a basic block diagram of a building 100 of the enterprise including an MLTS in accordance with some embodiments of the present inventive concept. As illustrated, building 100 is a multistory building, for example, five floors. Each floor has a designated Emergency Location Identification Number (ELIN). This is essentially the general phone number for the particular floor. To reach a specific person on that floor, a user must first dial the ELIN and then add the extension for the specific room or person they are trying to reach when prompted. As illustrated in FIG. 1, each floor has its own ELIN and a unique series of extensions for that floor. It will be understood that although FIG. 1 illustrates only a single ELIN per floor, embodiments of the present inventive concept are not limited to this configuration. For example, each floor may have more than one ELIN and each of the unique ELIN may be used to access a designated portion of that floor. When a worker inside the building makes an outgoing call through the MLTS 105, the person receiving the call will only see the ELIN, not the extension.

Although embodiments of the present inventive concept are discussed herein with respect to MLTSs where individual portions of a building are accessed using a series of extensions sharing a general phone number (ELIN), embodiments of the present inventive concept are not limited thereto. For example, embodiments of the present inventive concept may be applicable to systems where each office and/or room in the building is associated with a unique direct inward dialing (DID) number, i.e. a unique telephone number. However, similar to the details discussed above with respect to FIG. 1, when a worker with a specific DID number calls outside the building through the MLTS, the receiving party will only see the ELIN for the that DID number, not the DID number itself.

As discussed above, current VoIP 911 services may not be capable of complying with one or both of the Ray Baum's Act and Kari's law especially in a work from home situation. In particular, when a worker relocates their equipment from the physical location of the business enterprise (100) to a home office, the equipment is still associated with the physical address of the business enterprise 100 (123 Main Street) and not the worker's home address. Thus, when the worker calls 911 emergency services from their home office, the 911 operator will be given the wrong address for the "dispatchable location." An example of how the current VoIP 911 services operate will be discussed below with respect to FIG. 2.

Figure 2:
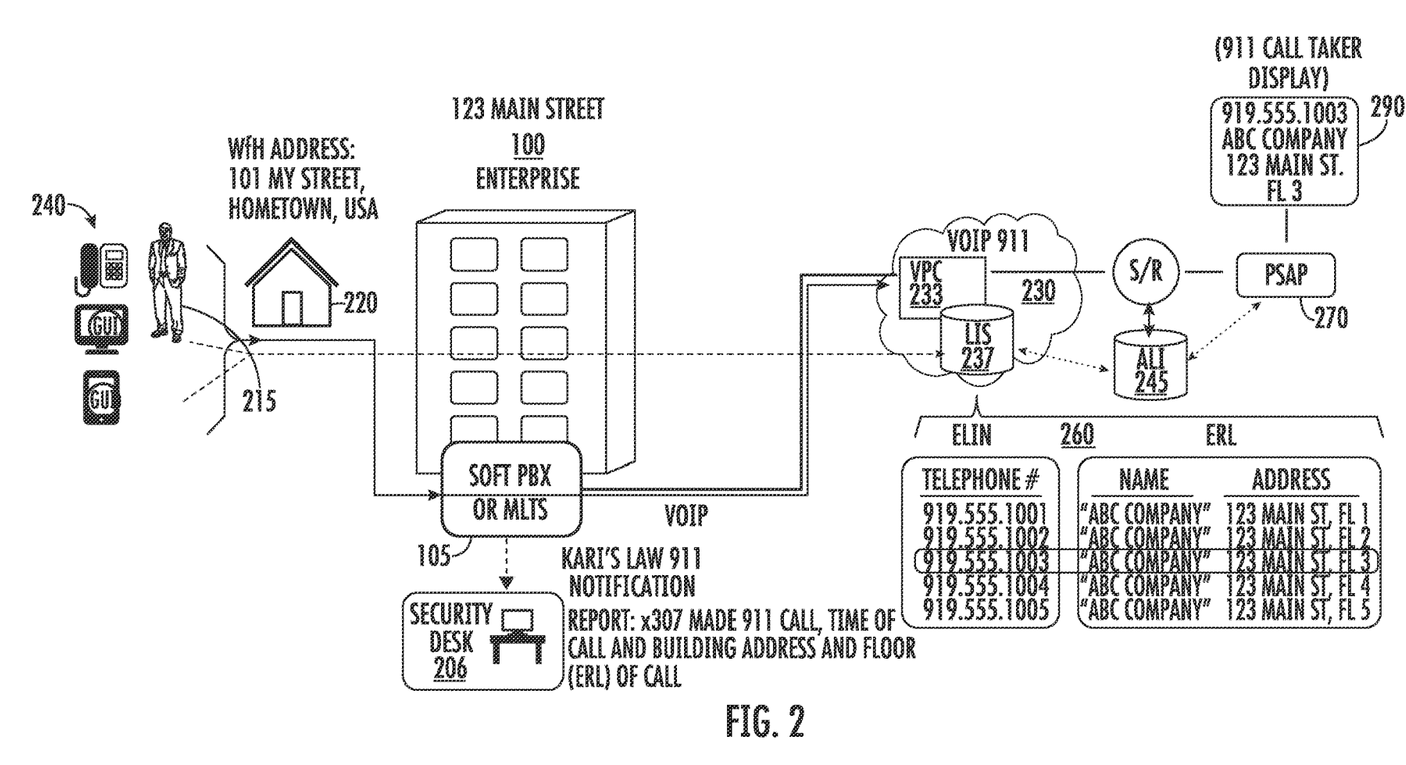
FIG. 2 is a block diagram of a system including an MLTS in a multistory building accordance with some embodiments of the present inventive concept.

Referring to FIG. 2, a block diagram illustrating a VoIP 911 system for use with a legacy MLTS will be discussed. As illustrated in FIG. 2, a worker 215 who is working from home 220 (101 My Street, Hometown, USA) initiates a VoIP 911 call using equipment 240 (endpoints) that has been relocated from the building 100 of the enterprise 100 (123 Main Street).

It will be understood that the system of FIG. 2 discussed herein is related to a VoIP emergency call being made using an MLTS 105. The VoIP network may be provided by a group of technologies and is a method for the delivery of voice communications and multimedia sessions over Internet Protocol (IP) networks, such as the Internet. The terms Internet telephony, broadband telephony, and broadband phone service specifically refer to the provisioning of communications services (voice, facsimile, short message service (SMS), voice-messaging and the like) over the Internet, rather than via the public switched telephone network (PSTN). The PSTN network is an aggregate of the world's circuit-switched telephone networks that are operated by national, regional, or local telephone operators, providing infrastructure and services for public telecommunication. The network discussed herein may be any combination of wired and/or wireless networks, including without limitation a direct interconnection, secured custom connection, private network (e.g., an enterprise intranet), public network (e.g., the Internet), personal area network (PAN), local area network (LAN), metropolitan area network (MAN), operating missions as nodes on the Internet (OMNI), wireless area network (WAN), wireless network (e.g., 802.11 WiFi), cellular network, and other communications networks.

The relocated equipment 240 may include, for example, an end user device such as a personal computer (PC), a mobile device such as smartphone, laptop, VoIP phone, IoT device, or another telephonic device. The relocated equipment communicates through the VoIP network.

Referring again to FIG. 2, the emergency caller initiates a VoIP 911 call from the relocated equipment 240 and this call is received at, for example, the VoIP 911 Server 230. As illustrated the VoIP 911 server 230 includes a VPC 233 and a location information server (LIS) 237. As further illustrated, the LIS 237 accesses the ELIN/Emergency Response Location (ERL) data that is used by the MLTS 105. In another embodiment, the LIS 237 need not be co-located with VPC 233 within the VoIP 911 Server 230 environment. Rather, LIS 237 may be separately maintained and housed such that it is remotely accessed by and communicable with VPC 233 and VoIP Server 230.

As discussed above, the ELIN is simply a 10-digit number and corresponds to the general number(s) associated with each floor of the building discussed above with respect to FIG. 1. The ERL identifies floor-level or room-level location in the building 100, for example, 123 Main Street, 3rd floor. The ELIN/ERL data 260 illustrated in FIG. 2 is for a five-story enterprise building 100 (FIG. 1) with 100 telephone extensions on each floor as shown in FIG. 1. These numbers are registered into the Automatic Location Identification (ALI) 245 database, which is the repository of name-number-address data to be displayed to the 911 operator during a 911 emergency call from remote worker. As illustrated, each ELIN is paired with the ERL address value that contains both the street address of the enterprise building 100, such as "123 Main Str.", as well as the particular floor that each ELIN services.

Thus, all extensions within the building can make 911 calls and the enterprise civic address as well as floor-level information will be displayed to the 911 operator. Each time an extension makes a 911 call, the ANI (Calling Line ID) of the outbound 911 call will be populated with the ELIN for the floor of the building that the extension is located upon. When the 911 call arrives at the Public Safety Answering Point (PSAP), the ELIN value is used to look-up the associated ERL address information.

In particular, as illustrated in FIG. 2, an emergency call is made by a worker at extension #307. This extension is located on the third ($3^{rd}$) floor and the MLTS 105 selects the ELIN value 919-555-1003 to populate the ANI (calling line ID) of the outbound 911 call. When that call arrives at the PSAP 270, the matching ERL address value of "123 Main Str., FL-3" is looked up in the ALI database 245. The public safety answering point (PSAP), sometimes called "public-safety access point," is a call center where emergency calls initiated by any mobile or landline subscriber are terminated. This floor-level information is displayed to the 911 operator as shown on the display 290 in FIG. 2.

The MLTS 105 at the building is unaware of the displacement of the location of the emergency caller and the related equipment. Thus, responsive to a VoIP 911 call, the MLTS 105 routes the VoIP 911 call normally using the ELIN/ERL designation. The designated ERL address displayed to public safety is the incorrect address of the enterprise building 100 including the floor or suite thereof and not the home address where the user is currently located. As illustrated, the incorrect information from the ERL is displayed to both public safety and to the security desk 206 which receives the Kari's Law notification.

Accordingly, as discussed above, a problem arises when users of MLTS devices relocate these devices and take them to their home offices and subsequently use them for calling 911 services. For example, this problem may occur when a physical desk phone is taken home and plugged into a router (which may also have been taken from the office for this purpose) to facilitate a home office work environment. Alternatively, when a virtual private network (VPN) is used to interconnect the desk phone (now located at home) to the office local area network (LAN), the local IP address of the user is obfuscated with the expected IP address of the user when they are at their desk. The MLTS has no technical ability to detect the user's displacement in location from the office to home. Similarly, this issue may occur when laptop application software, which acts as a Session Initiation Protocol (SIP) User Agent, is used to log directly into the MLTS and, thus, making it appear to be the users normal desk phone located at its usual location (or ERL) within the office enterprise environment.

Accordingly, embodiments of the present inventive concept provide methods and systems for collecting and storing work-from-home addresses and utilizing them in off-the-shelf legacy MLTSs without significant upgrades to the MLTSs themselves as will be discussed further below with respect to FIGS. 3 through 6.

Figure 3:
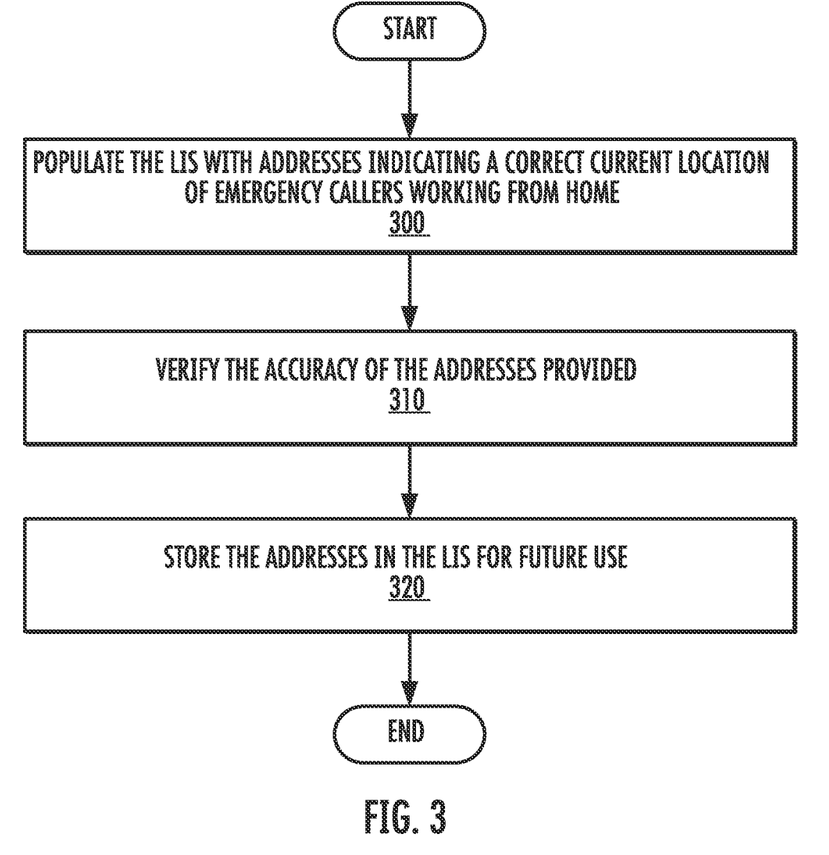
FIGS. 3 and 4 are flowcharts illustrating operations of providing correct work from home addresses to 911 operators in accordance with some embodiments of the present inventive concept.

Referring first to FIG. 3, a flowchart illustrating processing steps for collecting the address data in accordance with some embodiments of the present inventive concept will be discussed. Correctly processing 911 calls from workers who have taken their MLTS device or soft-phone home begins with appropriate home address collection and verification. This process may be analogous to a user's experience when using any location based service (LBS). LBS services, such as ordering a pizza via an phone application (App) for delivery or ordering a pick-up from a shared ride service, for example, Uber or Lyft, use a variety of mechanisms to determine the user's current location, confirm the veracity of that location and then render the service with the location data. The variety of methods of LBS-based location determination, confirmation and usage are generally known to those of skill in the art. For example, processing steps in data collection in accordance with some embodiments of the present inventive concept begin at block 300 by populating the LIS with addresses indicating a correct current location of emergency callers, i.e., workers who have relocated to a home office. Once this information is collected, the accuracy of the information may be verified by, for example, using location based services (block 310).

In particular, once collected (block 300), the work-from-home addresses are stored (block 320) for future use in a subsequent 911 emergency call. In some embodiments, this storage can be performed using third party software, MLTS augmentation or upgrade, or within the underlying 911 Service Provider, for example, in an i2 LIS. An example of a third party solution for home address management may include, but are not limited to, 911Secure SENTRY™ Gatekeeper and Redsky's 911Anywhere. Embodiments discussed herein assume that the work from home addresses are collected and stored directly into the LIS, however, it will be understood that embodiments of the present inventive concept are not limited thereto.

As discussed above with respect to FIG. 2, the address provided to the 911 operator and the address provided to the enterprise in the Kari's Law notification are both incorrect, i.e. the address provided belongs to the building enterprise. However, the Kari's Law notification does contain the correct user phone extension number. Thus, the Kari's Law notification in FIG. 2 contains the correct extension, but the wrong ERL, while the VoIP 911 call that arrives at the VoIP 911 server contains the same incorrect ERL and the extension is lost as discussed above. Briefly, the extension is replaced with the ELIN associated with the ERL data. Both the ELIN (call back number) and the ERL (incorrect address of "123 Main Str., FL-3") are displayed to public safety.

Accordingly, in some embodiments of the present inventive concept the incorrect ERL address is replaced with the correct home address that has been stored in the LIS as discussed above with respect to FIG. 3. However, since the 911 call arrives at the VoIP server only identified by the ELIN, additional information must be received by the VoIP server in order to fully associate the inbound call with the "lost" extension number. Only by knowing the user's extension number, present in the Kari's law notification, can the correct current home address be retrieved from the LIS. Thus, embodiments of the present inventive concept intercept the original Kari's Law notification before the notification reaches persons at the building, process the notification at the VoIP server using the extension present in the notification and then re-issue a corrected Kari's Law notification with the correct home address to persons at the building, for example, the security desk. The same correct address can is also passed to public safety as will be discussed further below with respect to FIGS. 4 and 5.

Figure 4:
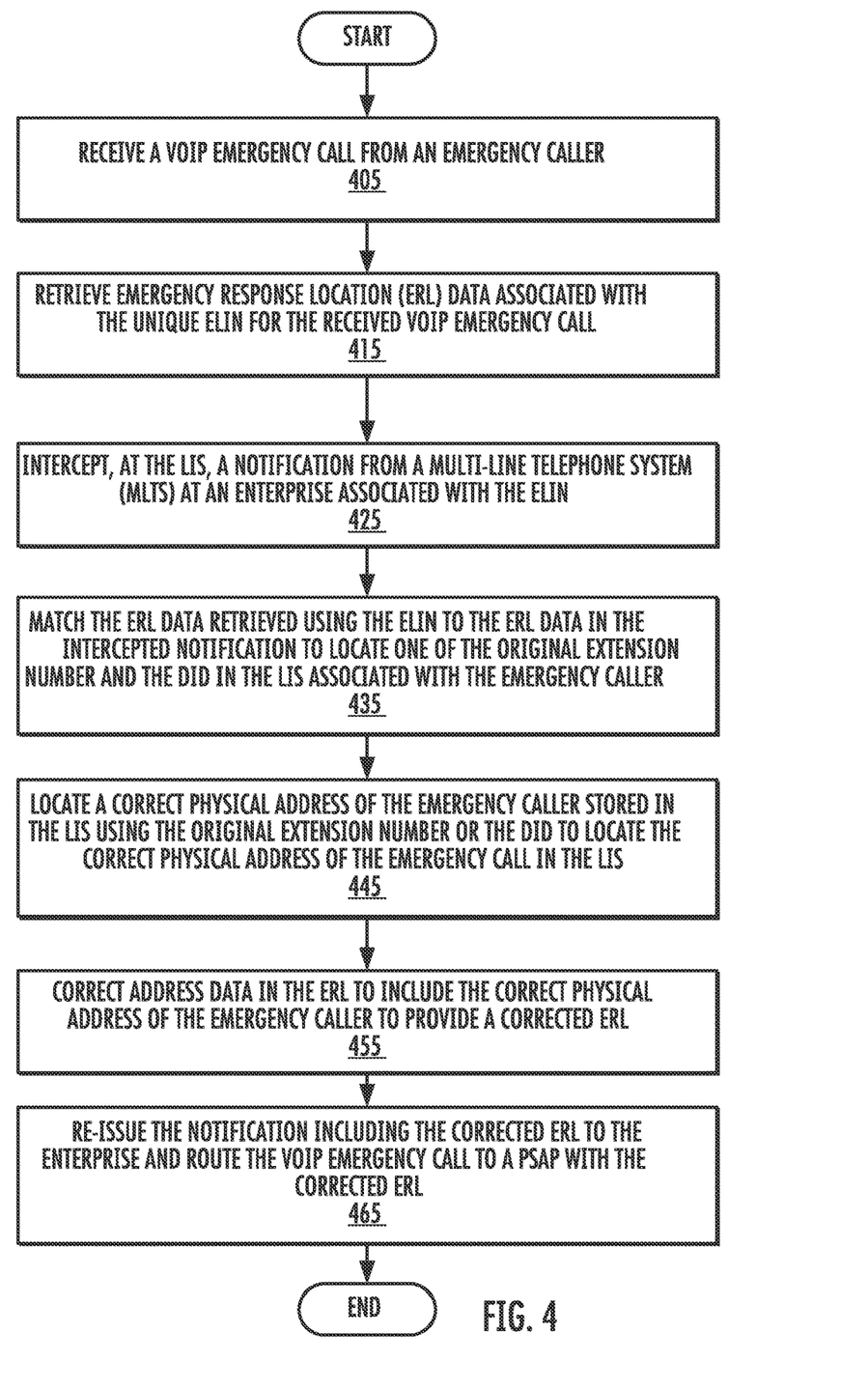

Referring now to the flowchart of FIG. 4, operations for ERL Correction in accordance with some embodiments of the present inventive concept will be discussed. As illustrated in FIG. 4, operations begin at block 405 by receiving a VoIP emergency call from an emergency caller. As discussed above, the emergency caller is a remote worker making the emergency call using equipment relocated from the enterprise building. The VoIP emergency call is identified by a unique emergency location identification number (ELIN). As discussed above, this ELIN is stripped of any extension or DID number by the MLTS as the VoIP call is communicated.

It will be understood that although embodiments discussed herein focus on a remote worker that has relocated equipment from the enterprise, embodiments are not limited to this configuration. For example, embodiments of the present inventive concept may be used in relation to any equipment that may somehow be associated with an address remote from where the person is currently positioned without departing from the scope of the present inventive concept.

ERL data associated with the unique ELIN for the received VoIP emergency call is retrieved from a LIS using the unique ELIN to locate the ERL data (block 415). In other words, the ELIN is used as a pointer to find the ERL data including address data in the LIS. A notification, for example, a Kari's Law Notification, is intercepted from an MLTS at an enterprise associated with the ELIN (block 425). In other words, instead of sending the notification directly to the persons at the enterprise, the notification is "intercepted" by the VoIP 911 server. The notification contains the same ERL data as the VoIP emergency call, but also contains an original extension number associated with the emergency caller or a DID number associated with the emergency caller. The ERL data retrieved using the ELIN is matched to the ERL data in the intercepted notification to locate the original extension number or the DID number in the LIS (block 435). The correct physical address of the emergency caller stored in the LIS is located using the original extension number or the DID number to locate the correct physical address of the emergency call in the LIS (block 445). In other words, the original extension number or the DID number is used to locate the correct work from home address stored in the LIS. The address data in the ERL is corrected to include the correct physical address of the emergency caller to provide a corrected ERL (block 455). The notification is reissued including the corrected ERL to the enterprise and the VoIP emergency call is routed to the PSAP with the corrected ERL (block 465). Thus, the address information presented to the 911 operator is now the correct work from home address, rather than the incorrect address of the building enterprise.

In some embodiments, the address included in the original ERL matches the address located using the original extension or the DID number. In these embodiments, correction of the address in the ERL may be bypassed.

In some embodiments, the VoIP emergency call is received at the VoIP 911 server, which may be, for example, an i2 server or VoIP Position Center (VPC) server.

As discussed above, in some embodiments, the unique ELIN for the received VoIP emergency call is used as a pointer to locate the ERL data in a look up table. Similarly, the original extension number or the DID number may be used as a pointer to locate the physical address of the emergency call in a lookup table in the LIS.

As will be further discussed below, in some embodiments, after receiving the VoIP emergency call from an emergency caller, a timestamp associated with the received call is stored. This timestamp may be used if more than one emergency call is received from the same multistory building MLTS to distinguish between calls received from a same MLTS.

Figure 5:
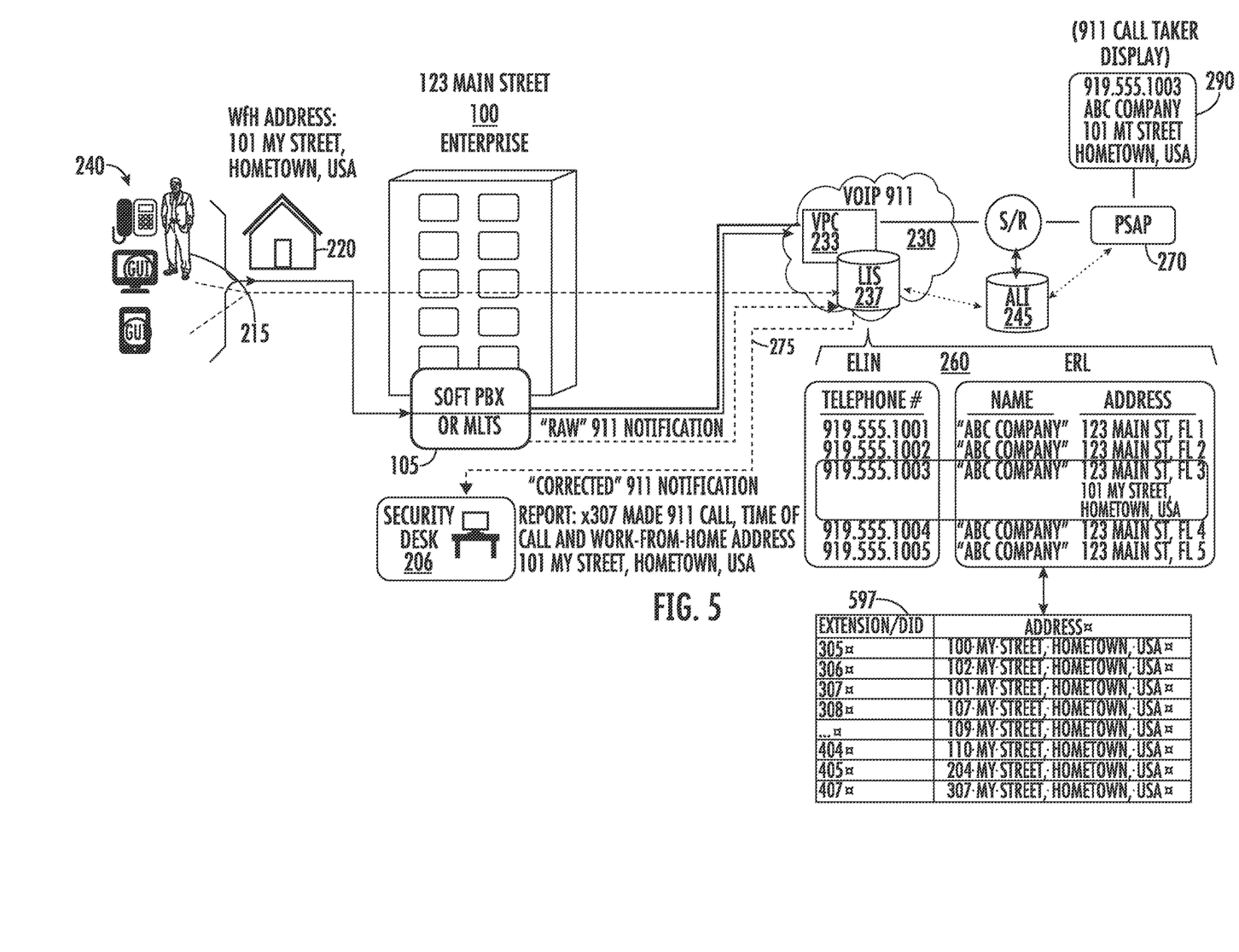
FIG. 5 is a block diagram of a system in which embodiments of the present inventive concept may be implemented.

Referring now to FIG. 5, a system including interception of the Kari's Law notification and correction thereof in accordance with embodiments of the present inventive concept will be discussed. It will be understood that the system illustrated in FIG. 5 is similar to the system of FIG. 2 and, therefore, like reference numerals depict like elements therein. Details discussed above may not be repeated in their entirety herein in the interest of brevity.

Referring now to FIG. 5, as discussed above, embodiments of the present inventive concept provide the correct work-from-home address of the emergency caller and correct the location content of both the originally issued Kari's Law notification and the 911 call to public safety itself by intercepting the Kari's law notification. As illustrated, the emergency caller 215 initiates an emergency call using the relocated equipment 240. The call is received at the VoIP 911 server 230. The received 911 call is identified by a unique ELIN, 919-555-1003, as shown in the ELIN/ERL data. Data for the ELIN is retrieved including the ERL data associated with the ELIN, which indicates that this caller is located at 123 Main St., Floor 3. This is incorrect as the emergency caller is working from home 220. However, in embodiments of the present inventive concept illustrated in FIG. 5, the Kari's Law notification is diverted (270) to the VoIP 911 server 230 where it is intercepted rather than being sent directly to the security desk 206. This notification contains both the extension number (or the DID number) of the caller and the ERL data provided by the MLTS which also includes the incorrect address. The ERL data of the incoming call and the ERL data included with the notification are matched to determine the original extension number/DID number of the emergency caller 215. The identified extension number/DID number is used as a pointer in a lookup table 597 to locate the correct work-from-home address of the emergency caller. As shown in the table 597 of FIG. 5, the work from home address for extension 307 is 101 My Street, Hometown USA. The Kari's Law notification is reissued 275 to the security desk 206 with the corrected work-from-home address and the emergency call is routed to the PSAP 270 with the corrected work-from-home address. Thus, the 911 operator is provided with the correct address on the display 290.

It will be understood that when using the determined extension number/DID number of the caller to retrieve the correct work-from-home address of the emergency caller from the table 597 if there is no active work-from-home address, then the caller is presumed to be at the enterprise office location 100 represented by the original ERL. Having determined that the original ERL is the current location of the caller, the substitution of a work-from-home address may not be performed.

It is further understood some embodiments of the present inventive concept can operate with a single ELIN-ERL pair for each location, i.e., each floor or suite location, at the MLTS 105 and without the need for MLTS hardware or software upgrades. Furthermore, in some embodiments of the present inventive concept a series of multiple 911 calls from the same location within the MLTS may be processed by assigning multiple ELIN numbers for each ERL. As discussed above, multiple ELIN values per ERL may be present in MLTSs equipped with the ELIN-ERL feature in order to ensure call-back functions are not overwritten when multiple 911 calls are made from the same location. Thus, when determining the extension number of the caller by matching the ERL data of the incoming call with the ERL data of the incoming Kari's Law notification it is understood that the timestamps of the arriving messages are evaluated to ensure they are within the same window of time, for example one or two seconds, and are produced from the same 911 caller. Ensuring that the ELIN pool per ERL is designed sufficiently large will ensure correct determination of extension number for 911 calls made from the same location (ERL) in short windows of time.

The 911 emergency call received by public safety is still identified by the ELIN value assigned by the MLTS. A subsequent call-back call to the ELIN will still be routed to the original extension phone/DID number of the caller, despite that device having been taken home. The call-back call function of the MLTS continues to function as designed without the need for hardware or software upgrades.

As discussed above, embodiments of the present inventive concept are not limited to non-DID or "extension-based" users. The present inventive concept can be used with DID-based users with their own unique telephone number. On a legacy MLTS, when the work-from-home user makes a 911 call, it is identified to the MLTS by the DID number, but the DID number is replaced by the ELIN as the call is passed to the Emergency Services Provider, or "VoIP 911". As a result, the VoIP 911 server has no ability to check the work-from-home status of the DID number because the DID number has been removed from the 911 call. Likewise, the MLTS will issue a Kari's Law notification that that bears the correct DID number, but also bears the incorrect location. That is, the reported location is that of the ERL (the floor or suite of the building where the calling phone device is no longer present) as opposed to the work-from-home address that can be stored at the LIS in association with the user's unique DID number. Thus, whether the user is identified by a non-DID extension or a DID number, the present inventive concept addresses the problem of incorrect location being used and presented in both the Kari's Law notification and the call to public safety.

Figure 6:
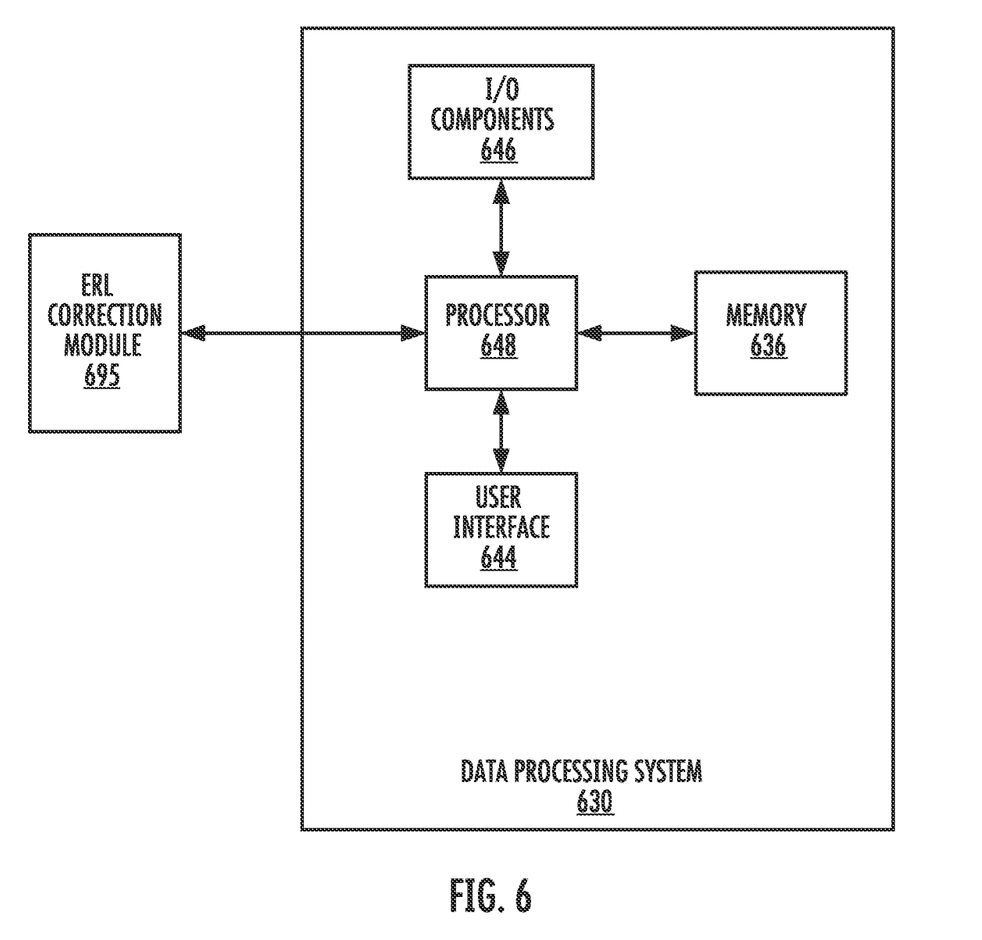
FIG. 6 is a high level block diagram of a data processing system for use with an Emergency Response Location (ERL) correction module in accordance with some embodiments of the present inventive concept.

Referring now to FIG. 6, an example of a data processing system 630 suitable for use with any of the examples described above. Although the example data processing system 630 is shown as in communication with the ERL correction module 695 in accordance with embodiments of the present inventive concept, the data processing system 630 may also be part of the ERL correction module 695 or in any other component of the system without departing from the scope of the present inventive concept. In some examples, the data processing system 630 can be any suitable computing device for performing operations according to the embodiments discussed herein described herein.

As illustrated, the data processing system 630 includes a processor 648 communicatively coupled to I/O components 646, a user interface 644 and a memory 636. The processor 648 can include one or more commercially available processors, embedded processors, secure processors, microprocessors, dual microprocessors, multi-core processors, other multi-processor architectures, another suitable processing device, or any combination of these. The memory 636, which can be any suitable tangible (and non-transitory) computer-readable medium such as random access memory (RAM), read-only memory (ROM), erasable and electronically programmable read-only memory (EEPROMs), or the like, embodies program components that configure operation of the data processing system 630.

I/O components 646 may be used to facilitate wired or wireless connections to devices such as one or more displays, game controllers, keyboards, mice, joysticks, cameras, buttons, speakers, microphones and/or other hardware used to input or output data. Memory 636 represents non-volatile storages such as magnetic, optical, or other storage media included in the data processing system and/or coupled to processor 648.

The user interface 644 may include, for example, a keyboard, keypad, touchpad, voice activation circuit, display or the like and the processor 648 may execute program code or instructions stored in memory 636.

It should be appreciated that data processing system 630 may also include additional processors, additional storage, and a computer-readable medium (not shown). The processor(s) 648 may execute additional computer-executable program instructions stored in memory 636. Such processors may include a microprocessor, digital signal processor, application-specific integrated circuit, field programmable gate arrays, programmable interrupt controllers, programmable logic devices, programmable read-only memories, electronically programmable read-only memories, or other similar devices.

As briefly discussed above, some embodiments of the present inventive concept provide a solution for correctly identifying the location of an employee working from home responsive to a VoIP 911 emergency call. By intercepting the Kari's Law notification at the VoIP server and using the extension or the DID number to lookup the work from home address, embodiments of the present inventive concept are able to provide a correct location to 911 emergency services. Furthermore, all of this accomplished without significant hardware and/or software upgrades to the existing system.

The aforementioned flow logic and/or methods show the functionality and operation of various services and applications described herein. If embodied in software, each block may represent a module, segment, or portion of code that includes program instructions to implement the specified logical function(s). The program instructions may be embodied in the form of source code that includes human-readable statements written in a programming language or machine code that includes numerical instructions recognizable by a suitable execution system such as a processor in a computer system or other system. The machine code may be converted from the source code, etc. Other suitable types of code include compiled code, interpreted code, executable code, static code, dynamic code, object-oriented code, visual code, and the like. The examples are not limited in this context.

If embodied in hardware, each block may represent a circuit or a number of interconnected circuits to implement the specified logical function(s). A circuit can include any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Qualcomm® Snapdragon®; Intel® Celeron®, Core (2) Duo®, Core i3, Core i5, Core i7, Itanium®, Pentium®, Xeon®, Atom® and XScale® processors; and similar processors. Other types of multi-core processors and other multi-processor architectures may also be employed as part of the circuitry. According to some examples, circuitry may also include an application specific integrated circuit (ASIC) or a field programmable gate array (FPGA), and modules may be implemented as hardware elements of the ASIC or the FPGA. Further, embodiments may be provided in the form of a chip, chipset or package.

Although the aforementioned flow logic and/or methods each show a specific order of execution, it is understood that the order of execution may differ from that which is depicted. Also, operations shown in succession in the flowcharts may be able to be executed concurrently or with partial concurrence. Further, in some embodiments, one or more of the operations may be skipped or omitted. In addition, any number of counters, state variables, warning semaphores, or messages might be added to the logical flows or methods described herein, for purposes of enhanced utility, accounting, performance measurement, or providing troubleshooting aids, etc. It is understood that all such variations are within the scope of the present disclosure. Moreover, not all operations illustrated in a flow logic or method may be required for a novel implementation.

Where any operation or component discussed herein is implemented in the form of software, any one of a number of programming languages may be employed such as, for example, C, C++, C #, Objective C, Java, Javascript, Perl, PHP, Visual Basic, Python, Ruby, Delphi, Flash, or other programming languages. Software components are stored in a memory and are executable by a processor. In this respect, the term "executable" means a program file that is in a form that can ultimately be run by a processor. Examples of executable programs may be, for example, a compiled program that can be translated into machine code in a format that can be loaded into a random access portion of a memory and run by a processor, source code that may be expressed in proper format such as object code that is capable of being loaded into a random access portion of a memory and executed by a processor, or source code that may be interpreted by another executable program to generate instructions in a random access portion of a memory to be executed by a processor, etc. An executable program may be stored in any portion or component of a memory. In the context of the present disclosure, a "computer-readable medium" can be any medium (e.g., memory) that can contain, store, or maintain the logic or application described herein for use by or in connection with the instruction execution system.

A memory is defined herein as an article of manufacture and including volatile and/or non-volatile memory, removable and/or non-removable memory, erasable and/or non-erasable memory, writeable and/or re-writeable memory, and so forth. Volatile components are those that do not retain data values upon loss of power. Nonvolatile components are those that retain data upon a loss of power. Thus, a memory may include, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may include, for example, static random access memory (SRAM), dynamic random access memory (DRAM), or magnetic random access memory (MRAM) and other such devices. The ROM may include, for example, a programmable read-only memory (PROM), an erasable programmable read-only memory (EPROM), an electrically erasable programmable read-only memory (EEPROM), or other like memory device.

The devices described herein may include multiple processors and multiple memories that operate in parallel processing circuits, respectively. In such a case, a local interface, such as a communication bus, may facilitate communication between any two of the multiple processors, between any processor and any of the memories, or between any two of the memories, etc. A local interface may include additional systems designed to coordinate this communication, including, for example, performing load balancing. A processor may be of electrical or of some other available construction.

It should be emphasized that the above-described embodiments of the present disclosure are merely possible examples of implementations set forth for a clear understanding of the principles of the disclosure. It is, of course, not possible to describe every conceivable combination of components and/or methodologies, but one of ordinary skill in the art may recognize that many further combinations and permutations are possible. That is, many variations and modifications may be made to the above-described embodiment(s) without departing substantially from the spirit and principles of the disclosure. All such modifications and variations are intended to be included herein within the scope of this disclosure and protected by the following claims.

That which is claimed is:

1. A method for Emergency Response Location (ERL) Correction, the method comprising:
receiving a Voice over Internet Protocol (VoIP) emergency call from an emergency caller, the VoIP emergency call being identified by a unique emergency location identification number (ELIN);
retrieving emergency response location (ERL) data associated with the unique ELIN for the received VoIP emergency call from a location information server (LIS) using the unique ELIN to locate the ERL data;
intercepting, at the LIS, a notification from a multi-line telephone system (MLTS) at an enterprise associated with the ELIN, the notification containing both an original extension number associated with the emergency caller or a direct inward dialing (DID) number associated with the emergency caller and the ERL data;

matching the ERL data retrieved using the ELIN to the ERL data in the intercepted notification to locate one of the original extension number and the DID number in the LIS associated with the emergency caller;

locating a correct physical address of the emergency caller stored in the LIS using the original extension number or the DID number to locate the correct physical address of the emergency call in the LIS;

correcting address data in the ERL to include the correct physical address of the emergency caller to provide a corrected ERL;

re-issuing the notification including the corrected ERL to the enterprise; and routing the VoIP emergency call to a Public Safety Answering Point (PSAP) with the corrected ERL.

2. The method of claim 1, wherein locating the correct physical address of the emergency caller stored in the LIS is followed by:

determining if the correct physical address of the emergency caller stored in the LIS is different from the address data in the ERL; and bypassing the correcting of the address data in the ERL if it is determined that the correct physical address of the emergency caller stored in the LIS and the address data in the ERL are the same.

3. The method of claim 1, wherein the receiving a VoIP emergency call from the emergency caller comprises receiving the VoIP emergency call at a VoIP 911 server wherein the VoIP 911 server comprises one of an i2 server and VoIP Position Center (VPC) server.

4. The method of claim 1, wherein receiving a VoIP emergency call is preceded by:

populating the LIS with addresses indicating a correct current location of emergency callers; and verifying accuracy of the addresses using location based services.

5. The method of claim 1, wherein retrieving ERL data associated with the unique ELIN for the received VoIP emergency call from the location information server (LIS) comprises using the unique ELIN as a pointer to locate the ERL data in a look up table.

6. The method of claim 1, wherein locating a correct physical address of the emergency caller stored in the LIS using one of the original extension number and the DID number as a pointer to locate the physical address of the emergency call in a lookup table in the LIS.

7. The method of claim 1 further comprising implementing the method without hardware and/or software upgrades to the MLTS.

8. The method of claim 1, further comprising:

after receiving the VoIP emergency call from the emergency caller, storing a timestamp associated with the received call; and using the stored timestamp of the VOIP emergency call to distinguish between calls received from a same MLTS.

9. The method of claim 1, wherein re-issuing the notification including the corrected ERL to the enterprise comprises sending the corrected ERL to the MLTS for distribution to a location at the enterprise.

10. A computer system for Emergency Response Location (ERL) Correction, the computer system comprising:

a non-transitory computer-readable medium; and a processor in communication with the non-transitory computer-readable medium, the processor configured to:

receive a Voice over Internet Protocol (VoIP) VOIP emergency call from an emergency caller, the VoIP emergency call being identified by a unique emergency location identification number (ELIN);

retrieve emergency response location (ERL) data associated with the unique ELIN for the received VoIP emergency call from a location information server (LIS) using the unique ELIN to locate the ERL data;

intercept, at the LIS, a notification from a multi-line telephone system (MLTS) at an enterprise associated with the ELIN, the notification containing both an original extension number associated with the emergency caller or a direct inward dialing (DID) number associated with the emergency caller and the ERL data;

match the ERL data retrieved using the ELIN to the ERL data in the intercepted notification to locate one of the original extension number and the DID number in the LIS associated with the emergency caller;

locate a correct physical address of the emergency caller stored in the LIS using the original extension number or the DID number to locate the correct physical address of the emergency call in the LIS;

correct address data in the ERL to include the correct physical address of the emergency caller to provide a corrected ERL;

re-issue the notification including the corrected ERL to the enterprise; and route the VoIP emergency call to a Public Safety Answering Point (PSAP) with the corrected ERL.

11. The computer system of claim 10, the processor further configured to:

determine if the correct physical address of the emergency caller stored in the LIS is different from the address data in the ERL; and bypass the correcting of the address data in the ERL if it is determined that the correct physical address of the emergency caller stored in the LIS and the address data in the ERL are the same.

12. The computer system of claim 10, the processor further configured to:

populate the LIS with addresses indicating a correct current location of emergency callers; and verify accuracy of the addresses indicating the correct location using location based services.

13. The computer system of claim 10, the processor further configured to retrieve ERL data associated with the unique ELIN for the received VoIP emergency call from the LIS using the unique ELIN as a pointer to locate the ERL data in a look up table.

14. The computer system of claim 10, the processor further configured to locate a correct physical address of the emergency caller stored in the LIS using one of the original extension number and the DID number as a pointer to locate the physical address of the emergency call in a lookup table in the LIS.

15. The computer system of claim 10, the processor further configured to:

after receiving the VoIP emergency call from an emergency caller, store a timestamp associated with the received call; and use the stored timestamp of the VOIP emergency call to distinguish between calls received from a same MLTS.

16. The computer system of claim 10, the processor further configured to re-issue the notification including the corrected ERL to the enterprise by sending the corrected ERL to the MLTS for distribution to a location at the enterprise.

17. At least one machine-readable non-transitory medium comprising a set of instructions executable on a computing device operating as a Voice over Internet Protocol (VoIP) 911 server to cause the computing device to correct an Emergency Response Location (ERL) by:
   receiving a Voice over Internet Protocol (VoIP) emergency call from an emergency caller, the VoIP emergency call being identified by a unique emergency location identification number (ELIN);
   retrieving emergency response location (ERL) data associated with the unique ELIN for the received VoIP emergency call from a location information server (LIS) using the unique ELIN to locate the ERL data;
   intercepting, at the LIS, a notification from a multi-line telephone system (MLTS) at an enterprise associated with the ELIN, the notification containing both an original extension number associated with the emergency caller or a direct inward dialing (DID) number associated with the emergency caller and the ERL data;
   matching the ERL data retrieved using the ELIN to the ERL data in the intercepted notification to locate one of the original extension number and the DID number in the LIS associated with the emergency caller;
   locating a correct physical address of the emergency caller stored in the LIS using the original extension number or the DID number to locate the correct physical address of the emergency call in the LIS;
   correcting address data in the ERL to include the correct physical address of the emergency caller to provide a corrected ERL;
   re-issuing the notification including the corrected ERL to the enterprise; and
   routing the VoIP emergency call to a Public Safety Answering Point (PSAP) with the corrected ERL.

18. The at least one machine-readable non-transitory medium of claim 17, wherein locating the correct physical address of the emergency caller stored in the LIS is followed by:
   determining if the correct physical address of the emergency caller stored in the LIS is different from the address data in the ERL; and
   bypassing the correcting of the address data in the ERL if it is determined that the correct physical address of the emergency caller stored in the LIS and the address data in the ERL are the same.

19. The at least one machine-readable non-transitory medium of claim 17, wherein the receiving the VoIP emergency call from an emergency caller comprises receiving the VoIP emergency call at the VoIP 911 server wherein the VoIP 911 server comprises one of an i2 server and VoIP Position Center (VPC) server.

20. The at least one machine-readable non-transitory medium of claim 17, wherein receiving a VoIP emergency call is preceded by:
   populating the LIS with addresses indicating a correct current location of emergency callers; and
   verifying accuracy of the addresses indicating the correct location using location based services.

21. The at least one machine-readable non-transitory medium of claim 17, wherein retrieving the ERL data associated with the unique ELIN for the received VoIP emergency call from a location information server (LIS) comprises using the unique ELIN as a pointer to locate the ERL data in a look up table.

22. The at least one machine-readable non-transitory medium of claim 17, wherein locating a correct physical address of the emergency caller stored in the LIS using one of the original extension number and the DID number as a pointer to locate the physical address of the emergency call in a lookup table in the LIS.

23. The at least one machine-readable non-transitory medium of claim 17, further comprising:
   after receiving the VoIP emergency call from an emergency caller, storing a timestamp associated with the received call; and
   using the stored timestamp of the VOIP emergency call to distinguish between calls received from a same MLTS.

24. The at least one machine-readable non-transitory medium of claim 17, wherein re-issuing the notification including the corrected ERL to the enterprise comprises sending the corrected ERL to the MLTS for distribution to a location at the enterprise.

* * * * *